May 21, 1963 W. B. HUCKABAY ET AL 3,090,938
UNDERWATER BEACON
Filed Aug. 31, 1959

INVENTORS
W. B. Huckabay &
W. H. Parker
BY
Jerry J. Dunlap
ATTORNEY

United States Patent Office 3,090,938
Patented May 21, 1963

---

3,090,938
UNDERWATER BEACON
William B. Huckabay and William H. Parker, Dallas, Tex., assignors, by mesne assignments, to Rayflex Exploration Company, Richardson, Tex., a corporation of Texas
Filed Aug. 31, 1959, Ser. No. 837,010
4 Claims. (Cl. 340—5)

This invention relates generally to improvements in the art of marking predetermined points or positions in a body of water for aiding the navigation of ships, boats and the like, and more particularly to an improved underwater acoustical beacon.

As it is well known in the art, the time-honored method of marking positions within a body of water has been by the use of buoys which float on the surface of the water and are anchored by suitable weights and cables to the bottom of the body of water. For example, buoys are almost universally used to mark submerged obstructions to navigation, and in time of war, such buoys are used to mark lanes which have been swept free of mines to guide friendly ships. As it is also well known, buoys are frequently moved by the action of rough seas, since they are exposed to the maximum turbulence of the sea, and the buoys are sometimes completely lost by the action of the sea.

The present invention contemplates a novel beacon for marking a predetermined position in a body of water which generally comprises a system for transmitting time-spaced pulse type signals through the water, and means for anchoring the transmitting system on the bottom of the body of water, whereby the apparatus will be subjected to a minimum movement of the water and will not be moved from the position where it is originally placed. The pulse type signals may be easily detected by suitable receivers aboard vessels passing in the locality of the beacon, such that both the direction and distance of the beacon from a vessel may be easily determined to provide an accurate navigational aid to the vessel.

The present invention also contemplates a novel construction of the anchoring means, such that the beacon will not likely be moved by fishermen dragging various instruments across the bottom of the body of water, and yet the beacon may be easily recovered by a suitable grappling device. In a preferred embodiment this invention further contemplates a novel transmitter system utilizing a gas-filled trigger tube actuated at time-spaced intervals by a secondary triggering or discharge circuit, such that a minimum power is required for transmitting the desired pulse type signals and the power supply will have a maximum service life. The present transmitter system provides a novel combination of elements which may be secured in a minimum space and will provide the maximum service life for a predetermined power supply capacity.

A general and important object of this invention is to increase the safety of navigation on bodies of water.

Another object of this invention is to accurately mark predetermined positions in a body of water, and to retain these markings accurately in position for an extended period of time.

Another object of this invention is to provide an underwater beacon having a high power output and yet being arranged and contained in a minimum-sized package.

A further object of this invention is to provide a pulse type transmitter system which is capable of being used underwater and will efficiently transmit time-spaced type signals through a body of water.

Another object of this invention is to provide a novel means for anchoring a transmitter system in a body of water, such that the transmitter system will not be moved by action of the water or by fishermen dragging various instruments along the bottom of the body of water.

A still further object of this invention is to provide an underwater beacon which is simple in construction, which may be economically manufactured and which will have a long service life.

Other objects and advantages of the invention will be evident from the following detailed description, when read in conjunction with the accompanying drawings which illustrate our invention.

Figure 1:
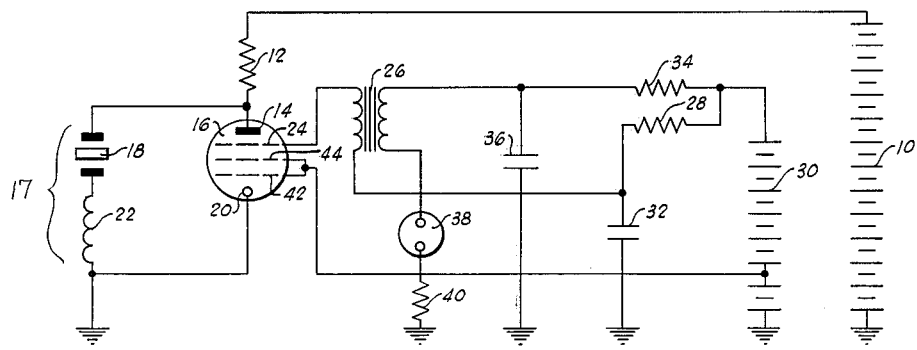
FIGURE 1 is a schematic wiring diagram of the preferred transmitter system of the present invention.

Referring to the drawings in detail, and particularly FIG. 1, the preferred transmitter system of the present invention includes a primary power supply 10 in the form of a high voltage battery. We have found that a 600 or 900 volt battery is adequate for most applications for the present invention. The negative side of the battery 10 is connected to ground and the positive side of the battery is connected through a resistor 12 to the anode 14 of a cold cathode gas trigger tube 16, such as a Sylvania trigger tube type OA5. An acoustical signal transmitting resonating network 17 is connected across the anode 14 and the cathode 20 of the tube 16 and comprises a transmitting element 18 and an inductance 22 connected in series. It will also be noted that a ground is provided between the inductance 22 and the cathode 20 of the tube 16. In a preferred embodiment the transmitting element 18 is in the form of a cylinder type construction of piezoelectric material (such as quartz or barium titinate) capable of storing a charge of the amplitude provided by the power supply 10 and capable of transmitting a pulse type signal when this charge is removed or imposed. In the embodiment shown in FIG. 1 it will be observed that the transmitting element 18 is normally charged by the power source 10 through the anode circuit of the trigger tube 16 and will be quickly discharged upon activation of the trigger tube 16, as will be described.

The trigger grid 24 of the trigger tube 16 is connected to one side of the secondary of a suitable transformer 26, and the opposite side of the secondary of the transformer 26 is connected through a resistor 28 to the positive side of a secondary power supply 30, such as a series of batteries. It will also be observed that this last-mentioned side of the secondary of the transformer 26 is also connected through a capacitor 32 to ground. One side of the primary of the transformer 26 is also connected through a resistor 34 to the positive side of the secondary power supply 30, as well as through a capacitor 36 to ground. The opposite side of the primary of the transformer 26 is connected through a suitable gas filled tube 38 of the intermittently discharging type, such as a type NE2, and a resistor 40 to ground. It will thus be observed that the secondary power supply builds up a charge on the parallel connected capacitor 36 and tube 38 until the tube 38 begins discharging through the resistor 40. At this time the charge on the capacitor 36 then directs a current through the primary of the transformer 26 to energize the transformer 26 and impose a substantial charge on the trigger grid 24 of the trigger tube 16.

In one embodiment of this invention the secondary power supply 30 produces 135 volts and the transformer 26 is so wound as to provide a potential of 1000 volts across the secondary thereof when the primary is energized by discharging of the tube 38, such that the trigger grid 24 will be provided with sufficient potential to fire the tube 16 and provide a discharge of the potential imposed across the transmitting element 18 for sending a pulse type signal. The keep-alive grid 42 and the shield grid 44 of the trigger tube 16 are connected in parallel to an intermediate portion of the power supply 30 to provide an efficient operation of the trigger tube 16. In the embodiment where the secondary power supply 30 produces a total of 135 volts, the grids 42 and 44 are connected to this power supply at such a point as to be provided with a potential of approximately 45 volts.

From the foregoing it will be observed that the transmitter system of this invention will provide a pulse type signal of adequate power at any predetermined time-spaced intervals. In a commercial application of this invention, the primary power supply 10 provides 900 volts at 500 amps and the time constant of the discharge tube 38 is selected at approximately five seconds, such that the output of the transmitter system is in the form of a pulse type signal every five seconds having a power of 450 kw. With this arrangement the transmitter system may have a service life of at least one year before it is required to replace the power supplies.

Figure 2:
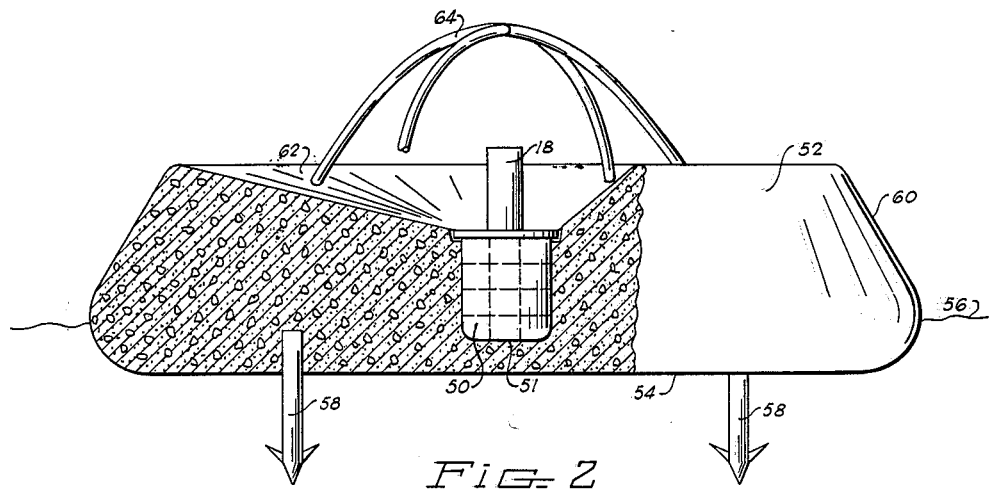
FIGURE 2 is an elevational view, partly in section, of the preferred beacon construction positioned at the bottom of a body of water.

In order to properly position the transmitter system in a body of water, the entire transmitter system is installed in a cylindrically shaped container 50, as shown in FIG. 2, with the transmitting element 18 projecting upwardly from the top of the container into the water in which the beacon is positioned. The container 50 may be of any suitable construction which will withstand the action of the water in which the apparatus is to be used and may be, for example, stainless steel or a plastic material. The container 50 is embedded in a complementary recess 51 in the central portion of an anchor 52 which is preferably in the form of a generally circular shaped body of concrete having a substantially flat bottom 54 for resting in a level position on the bottom 56 of a body of water. Normally, the anchor 52 will settle into the bottom 56 into a position as illustrated in FIG. 2. A plurality of legs 58 are extended downwardly from the anchor 52 to facilitate engagement of the anchor with the bottom 56 and further assure that the anchor will not be moved by action of the water or by inadvertent blows. The side walls 60 of the anchor 52 are preferably tapered downwardly and outwardly, such that any device (not shown) being drug across the bottom 56 of the body of water by a fisherman or the like will tend to slide upwardly over the top of the anchor 52 and will not dislodge the anchor from its position on the bottom 56. The central portion 62 of the anchor 52 is preferably dished downwardly in a concave fashion toward the container 50 to protect the transmitting element 18 from inadvertent blows. Further protection for the transmitting element 18 is provided by a series of curved arms 64 suitably anchored at their opposite ends in the upper portion of the concrete forming the anchor 52 and extends in crossing relation above the transmitting element 18. Also, the arms 64 may be used to receive a suitable grapple (not shown) extended downwardly from a vessel when it is desired to retrieve the beacon.

Figure 4:
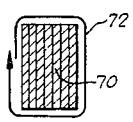
FIGURE 4 is a sectional view as taken through one side of the transmitting element shown in FIG. 3.
Figure 3:
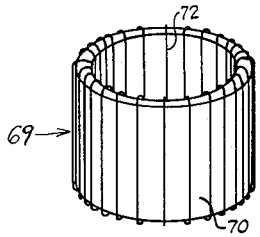
FIGURE 3 is a perspective view of an alternate acoustical transmitting element construction.

An alternate transmitting element, generally designated by reference character 69, is illustrated in FIGS. 3 and 4 and comprises a strip of magnetostrictive material 70, such as nickel and nickel alloys, wound helically into a cylindrical configuration. A coil 72 is wound around the sides of the cylinder formed by the material 70 in the manner illustrated in FIG. 4, such that the material 70 will change dimension when magnetized by the passage of current through the coil 72 to produce a signal in water surrounding the apparatus.

Figure 5:
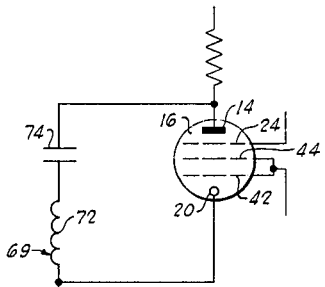
FIGURE 5 is a portion of a wiring diagram illustrating the connections required for use of the alternate transmitting element shown in FIGS. 3 and 4.

In connecting the magnetostrictive transmitting element 69 in the present transmitter system, the coil 72 is connected across the anode 14 and the cathode 20 of the trigger tube 16 as illustrated in FIG. 5. Also, a capacitor 74 is connected in series between the coil 72 and anode 14 and has sufficient capacity to store the charge provided by the primary power source 10 when the trigger tube 16 is non-conductive to complete the resonating network connected across the anode 14 and cathode 20. It will be apparent that when the tube 16 is triggered, the charge stored on the upper plate of the capacitor 74 will provide a substantial current through the tube 16 and the coil 72 to magnetize the magnetostrictive material 70 and generate a pulse type signal.

From the foregoing it will be apparent that the present invention will materially increase the safety of navigation of vessels, and may be used in either lakes or seas. The transmitter system will be retained in the desired position on the bottom of the body of water and will transmit pulse type signals at time-spaced intervals, such that any vessel within the range of the transmitter system may receive the pulse type signals and be guided thereby. The novel anchoring means will firmly hold the apparatus in a desired position and will not be moved either by action of the body of water or by someone dragging an instrument along the bottom of the body of water. The novel transmitter system utilizes a combination of elements which will provide the maximum service life for the power supply of the transmitter system and which allows the entire transmitter system to be stored or installed in a minimum space. The present transmitter system also facilitates the development of the maximum power while submerged in a body of water to obtain the maximum range for the pulse type signals.

Changes may be made in the combination and arrangement of parts or elements as heretofore set forth in the specifications and shown in the drawings, it being understood that changes may be made in the embodiments disclosed without departing from the spirit and scope of the invention as defined in the following claims.

We claim:

1. In a beacon for marking a position in a body of water, a transmitter system for sending time-spaced pulse type signals through the water for an extended period of time, comprising an acoustical signal transmitting resonating network; a cold cathode gas-filled trigger tube having an anode, cathode and trigger grid; said network being connected across the anode and cathode of the trigger tube and forming a primary discharge circuit; a primary power supply connected to the anode of the trigger tube; a secondary, lower voltage, power supply; and a secondary discharge circuit connected to the secondary power supply and to the trigger grid of the trigger tube for momentarily energizing said trigger grid at time-spaced intervals and sequentially firing the trigger tube, whereby said network is activated at corresponding time-spaced intervals for transmitting said pulses, said secondary discharge circuit comprising a transformer having its secondary connected in series with the trigger grid of the trigger tube and having one end of its primary connected in series with the secondary power supply, an intermittently discharging tube connected in series with the opposite end of said primary and ground, and a condenser connected to the secondary power supply and to ground in parallel with said primary.

2. A beacon as defined in claim 1 characterized further in that said network comprises a cylinder of piezoelectric material and an inductance connected in series.

3. A beacon as defined in claim 1 characterized further in that said network comprises a strip of magnetostrictive material shaped into cylindrical form, a coil wound around said material, and a capacitance connected in series with said coil.

4. In a beacon for marking a position in a body of water, a transmitter system for sending time-spaced pulse type signals through the water for an extended period of time, comprising an acoustical signal transmitting resonating network; a cold cathode gas-filled trigger tube having an anode, cathode and trigger grid; said network being connected across the anode and cathode of the trigger tube and forming a primary discharge circuit; a primary power supply connected to the anode of the trigger tube; a secondary, lower voltage, power supply; and a secondary discharge circuit connected to the secondary power supply and to the trigger grid of the trigger tube for momentarily energizing said trigger grid at time-spaced intervals and sequentially firing the trigger tube, whereby said network is activated at corresponding time-spaced intervals for transmitting said pulses, said secondary discharge circuit including capacitance means arranged to be charged by the secondary power supply, and means for intermittently imposing the charge of the capacitance means on the trigger grid of the trigger tube for firing the trigger tube.

References Cited in the file of this patent

UNITED STATES PATENTS

| | | |
|---|---|---|
| 989,250 | Gray | Apr. 11, 1911 |
| 1,460,175 | Rayder | June 26, 1923 |
| 1,485,776 | Harrison | Mar. 4, 1924 |
| 2,520,520 | Woodward | Aug. 29, 1950 |
| 2,562,449 | De Lano | July 31, 1951 |
| 2,594,702 | Woodward | Apr. 29, 1952 |
| 2,725,547 | Fryklund | Nov. 29, 1955 |
| 2,737,639 | Summers et al. | Mar. 6, 1956 |
| 2,762,032 | Vogel | Sept. 4, 1956 |
| 2,823,319 | Vossberg | Feb. 11, 1958 |
| 2,842,959 | Henry | July 15, 1958 |
| 2,852,676 | Joy | Sept. 16, 1958 |